J. W. Monical,
Plow Attachment.

No. 85,601. Patented Jan. 5, 1869.

Witnesses:
W. Burris
David A. Burr

Inventor:
James W. Monical
by G. B. Fowler, Atty.

JAMES W. MONICAL, OF MOORESVILLE, INDIANA, ASSIGNOR TO HIMSELF AND ADAM HOWE.

Letters Patent No. 85,601, dated January 5, 1869.

IMPROVEMENT IN PLOW-ATTACHMENT.

The Schedule referred to in these Letters Patent and making part of the same.

*To all whom it may concern:*

Be it known that I, JAMES W. MONICAL, of Mooresville, in the county of Morgan, and State of Indiana, have invented a new and useful Improvement in Plow-Attachments; and I do hereby declare that the following is a clear, full, and exact description of the construction and operation of the same, reference being had to the accompanying dawings, making a part of this specification, in which—

Like letters in the different figures of the drawings indicate like parts.

Nature.

My invention relates to plow-attachments for protecting small corn from being covered or broken down by clods or rubbish while plowing; and The nature of my invention consists of an adjustable shield, with two or more rods attached to the forward end thereof, and the rear end curved toward the plow, loosely attached to vertical slides, to allow the shield to play up and down in passing over roots or other uneven substances, the vertical slides being attached by screw-bolts to horizontal slides, for regulating the space between the shield and the plow, thus allowing the plow to run nearer to or further from the corn, as may be desired.

Construction.

Figure 2:
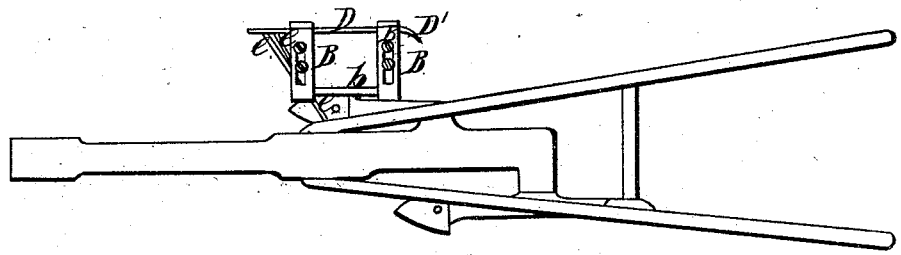
Figure 2 is a plan view of the same.

I construct a shield, D D, with slots *a a*, and with a flaring or curved end, as seen in fig. 2.

The shield is attached loosely by screw-bolts to vertical-slotted slides C C, the upper ends of which are bent to a horizontal position, and extend toward the plow, and are attached by proper screw-bolts to and slide under horizontal-slotted slides B B, which are connected and stayed at the top by bar *b*.

Figure 1:
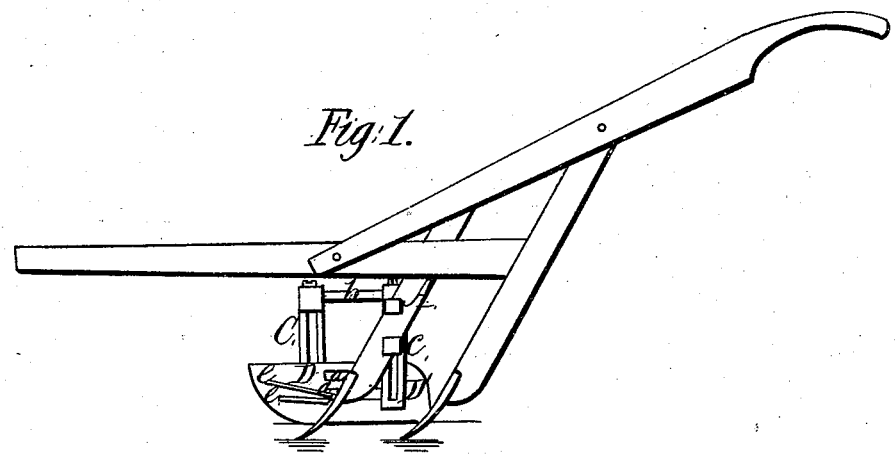
Figure 1 is a side elevation of the plow, having my mproved attachment.
Figure 3:
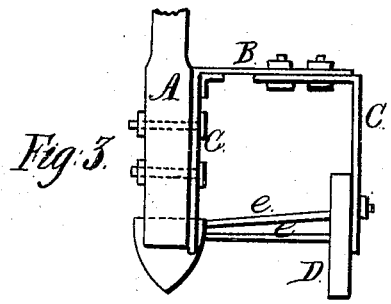
Figure 3 is a rear-end elevation of the attachment, and a portion of the forward standard.

The rear slide B is provided with a vertical-slotted shank, *c*, for fastening the attachment to the plow-standard A, by proper bolts, as seen in figs. 1 and 3 of the drawings.

Rods *e e* are attached to the front part of shield D, and extend to the plow, for throwing back the large clods and other rubbish, and preventing them from collecting and choking between the shield and plow.

Operation.

By means of the slotted shank *c*, the attachment is fastened to the standard or knee of the plow, at any required height, and may readily be raised or lowered, to suit the depth of the plowing.

The space between the shield and plow is regulated by the horizontal slides B B, and the shield being loosely attached to slides C C, is allowed to slide up and down in passing over roots, rocks, or other uneven substances, and thus avoids throwing the plow out of the ground.

The curve on the rear end of the shield D presses the clods or rubbish, which may pass under or between the rods, away from the corn, back into the furrow.

The rods in front are designed to prevent the accumulation of large clods or other substances between the shield and plow, and thus choking of the plow is avoided, while the shield passes near the corn, preventing it from being covered or broken down, but allowing, through slots *a a*, the fine dirt to be thrown to its roots.

Claims.

Having thus fully described my invention,

What I claim therein as new, and desire to secure by Letters Patent, is—

1. The adjustable shield D, as constructed with slots *a a* and curved end D', in combination with slides C C and B B, substantially in the manner and for the purpose as described.

2. The rods *e e*, in combination with the shield D, substantially as and for the purpose described.

JAS. W. MONICAL.

Witnesses:
THOS. E. JOHNSON,
BEN. D. HOUSE.